Figure 1:
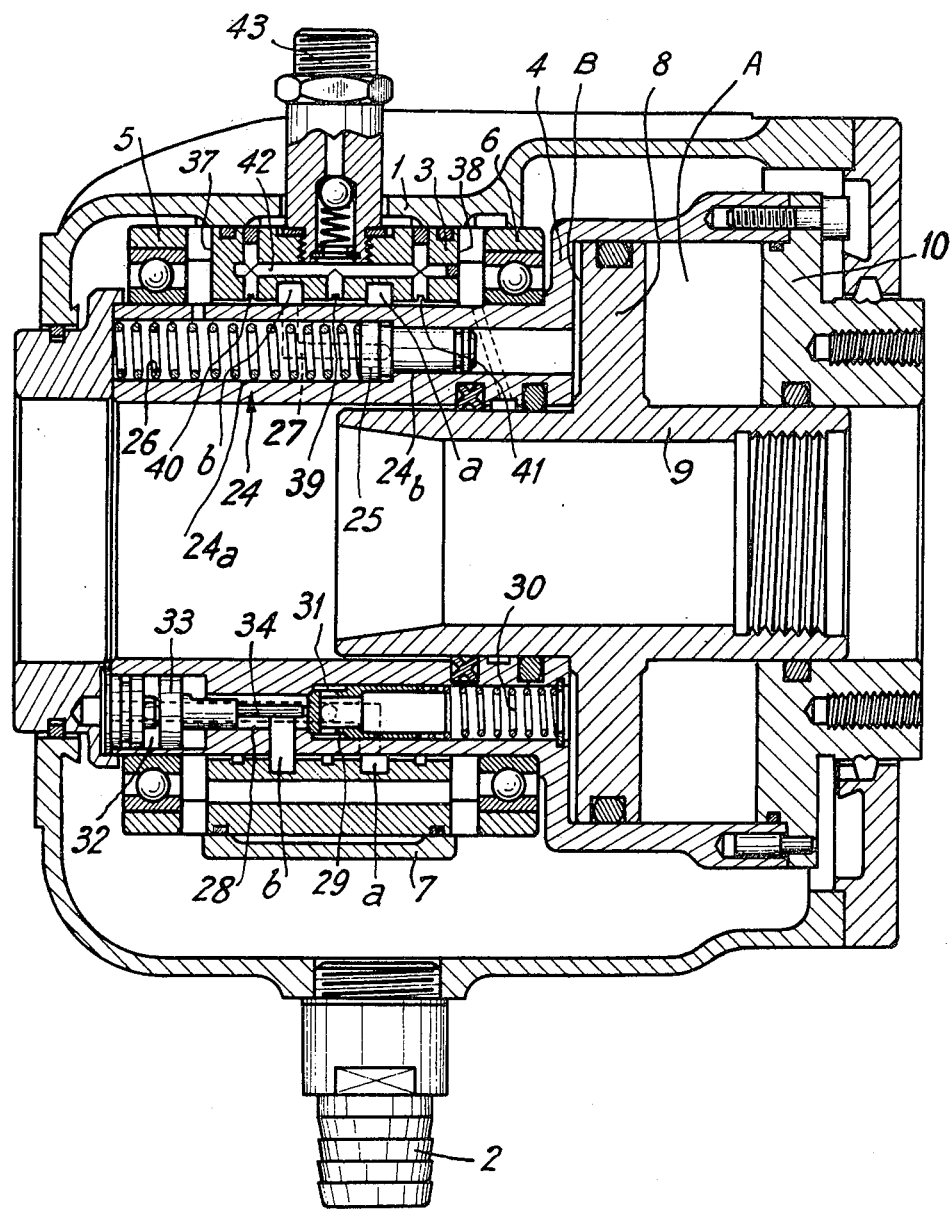

United States Patent [19]

Lioux

[11] 3,988,969

[45] Nov. 2, 1976

[54] ROTARY HYDRAULIC JACK

[75] Inventor: Jean Lioux, Rueil-Malmaison, France

[73] Assignee: La Precision Industrielle, Rueil-Malmaison, France

[22] Filed: Apr. 9, 1974

[21] Appl. No.: 459,279

[30] Foreign Application Priority Data

Apr. 13, 1973  France .............................. 73.13434

[52] U.S. Cl. .................................... 91/420; 91/46; 91/471; 92/80; 92/106; 92/156

[51] Int. Cl.² ................. F01B 31/10; F15B 13/042; F15B 21/04

[58] Field of Search ....................... 91/46, 420, 471; 92/106, 87, 80, 156; 279/4; 137/240; 308/DIG. 1

[56] References Cited

UNITED STATES PATENTS

| | | | |
|---|---|---|---|
| 2,318,638 | 5/1943 | Scott .................................. | 137/240 |
| 2,835,227 | 5/1958 | Gamet .................................. | 92/106 |
| 3,020,057 | 2/1962 | Gamet .................................. | 92/106 X |
| 3,090,544 | 5/1963 | Woollenweber, Jr. et al. | 308/DIG. 1 |
| 3,380,350 | 4/1968 | Stewart ................................ | 92/106 |
| 3,439,925 | 4/1969 | Sampson ............................. | 92/106 X |
| 3,570,510 | 3/1971 | Tsutsumi .......................... | 137/240 X |
| 3,748,968 | 7/1973 | Pinto ................................. | 92/106 X |

FOREIGN PATENTS OR APPLICATIONS

513,390  10/1939  United Kingdom .................. 92/106

*Primary Examiner*—Irwin C. Cohen
*Attorney, Agent, or Firm*—Karl W. Flocks

[57] ABSTRACT

A rotary hydraulic jack having two jack compartments, comprising a rotary hydraulic joint for the supply of hydraulic liquid to and the evacuation of hydraulic liquid from at least one of the compartments. The hydraulic joint comprises a fixed, hollow cylindrical part and a rotary part supported by bearings with a narrow annular gap between itself and the fixed part. A passageway leads to said compartment and has a portion in each of the fixed and rotary parts, the passageway portion in the rotary part being equipped with at least one non-return device for hydraulic liquid supplied to said compartment. A groove is provided in at least one of the fixed and rotary parts and communicates with the passageway portions in the fixed and rotary parts. Means is provided for supplying gas under pressure to the annular gap betwen the fixed and rotary parts for the purpose of expelling residual oil from the gap after the supply of hydraulic liquid under pressure to said compartment via the passageway has been completed.

6 Claims, 2 Drawing Figures

ROTARY HYDRAULIC JACK

This invention relates to an improved hydraulic rotary jack, in particular for controlling the chuck of a machine tool.

Such rotary jacks are already known in which the two jack compartments are fed, in turn, with hydraulic fluid under pressure through the intermediary of a hydraulic joint which is rotatable with no contact between its solid parts. The hydraulic fluid is, in general, an oil; it may also be a synthetic fluid which, like oil, has lubricating properties. For the sake of simplicity in this specification, such hydraulic fluid will be referred to as oil.

For exhausting oil from, and feeding it to, the two compartments, the jack comprises a hollow, fixed cylindrical part in which fixed passageways are provided for leading oil to the compartments. In addition, a cylindrical part having passageways communicating with the compartments is supported by bearings for rotation in the fixed part, there being no direct contact between the fixed and rotary parts. Two grooves, communicating respectively with the passageways in the fixed and rotary parts, are arranged in at least one of the said parts for the passage of oil from one part to the other.

At the cost of small oil losses which occur in the annular gap between the fixed and rotary parts of the jack (which losses are smaller as the respective internal and extenal diameters of the said parts are made more nearly equal), it is possible to control the rotary jack by alternately pressurising the two passageways, the other passageway being alternately connected to exhaust.

Because of this oil loss, in order to maintain the jack in service it is necessary to maintain the source of hydraulic pressure permanently operative. In the case of failure of the latter, the jack is freed, which can present serious dangers, especially on machine tools.

To overcome this, it has already been proposed to provide a non-return device, in particular a valve, in each of the passageways in the rotary part of the jack. In order to permit control of the jack, i.e. the evacuation of the oil contained in the compartment other than the one which it is desired to place under pressure, the oil under pressure is arranged to act, in general through the intermediary of a piston provided with an axial extension, on the non-return valve in the passageway connected to the compartment which is to be evacuated, in order to force the valve to open.

Finally, in order to maintain the hydraulic pressure in the active compartment of the jack, it has already been proposed to use a hydraulic pressure accumulator in connection with the said active compartment downstream of the non-return valve in the passageway connected to the active compartment.

In particular, in the Specification of my U.S. patent application Ser. No. 348,598 filed on Apr. 6 1973, there is proposed a particular form of pressure accumulator which not only ensures the maintenance of the pressure in the active compartment, but permits an increase of this pressure in the interior of the active compartment, to a degree which may be quite considerable when the control pressure is released. This accumulator includes a differential piston which is urged by a spring, in a cavity having portions of two different diameters, in the direction towards the portion of smaller diameter of the cavity, which portion is connected to the jack compartment which is being supplied with oil under pressure. At the same time, pressurised oil is supplied to said cavity in order to force the differential piston in a direction opposed to the action of its spring.

Thus, when the accumulator is supplied with oil under pressure, the spring is compressed by the oil acting, via the differential piston, on a surface equal to the large cross-section of the cylindrical cavity. On the other hand, when the oil pressure is released, the now strongly compressed spring acts, via the piston, on only the small cross-sectional area of the cavity and gives rise in the latter and, as a result, in the active compartment of the jack, to a pressure greater than the control pressure.

Since an accumulator maintains or increases the value of the working pressure in the jack, when in service the non-return devices close the jack compartments, it becomes unnecessary (and even dangerous in the case of increase of the pressure) to continue feeding oil to the jack.

In the aforesaid Specification, it has been proposed to continue feeding oil under a reduced pressure for the purposes of cooling and lubricating the support bearings of the rotary part of the jack.

Now it is known that radial joints for the transfer of hydraulic pressure have their speed of rotation limited by molecular friction of the oil in the boundary layers (which in practice interpenetrate) at the two walls of the narrow gap or annular slot which, at the expense of the losses already mentioned, ensures the tightness of the joint. If all feeding of oil to said grooves ceases, this phenomenon continues and even becomes aggravated, since the oil remaining in the grooves no longer conducts away the heat generated.

In the case of stopping the oil distribution, irrespective of the viscosity of the oil and the geometrical precision and quality of the finish of the surfaces present, the relative speed of movement of the surfaces cannot exceed 20 m/sec in view of the thermal disequilibrium which appears between the rotary part and the fixed part, the latter being, by design, better cooled than the former.

The present invention enables an increase, without risk of heating and loss of energy, of the speed of rotation of a radial rotary joint in which, by means of non-return devices, the feeding of oil may be stopped after control of the jack is stopped.

According to the invention, a rotary hydraulic jack, in particular for the control of the chuck of a machine tool, having two jack compartments, comprising a rotary hydraulic joint for the supply of oil (as hereinbefore defined) to and the evacuation of oil from at least one of said compartments, which hydraulic joint comprises a fixed, hollow cylindrical part and a rotary part supported by bearings with a narrow annular gap between itself and said fixed part, a passageway leading to said compartment and having a portion in each of said fixed and rotary parts, the passageway portion in the rotary part being equipped with at least one non-return device for oil supplied to said compartment, and a groove provided in at least one of said parts and communicating with said passageway portions in said fixed and rotary parts, is characterised in that means is provided for supplying gas under pressure to said annular gap for the purpose of expelling residual oil from said gap after the supply of oil under pressure to said compartment via said passageway has been completed.

Advantageously, the gas employed is air and for the sake of simplicity in the ensuing description only air will be mentioned, although it will be understood that any non-corrosive gas which is not liquefied as it expands into the annular gap may be substituted therefor.

In order to obtain a complete expulsion of the oil, the air under pressure may be admitted into at least one peripheral auxiliary groove of the rotary joint. Preferably, such an auxiliary groove is arranged between the two oil-conducting grooves and between each of these latter grooves and the corresponding end of the annular gap, these different auxiliary grooves being fed in parallel from a source of air under pressure provided with a non-return valve.

Preferably, the air thus used is charged with a mist of oil which permits lubrication of the bearings supporting the rotary part of the hydraulic joint.

Figure 2:
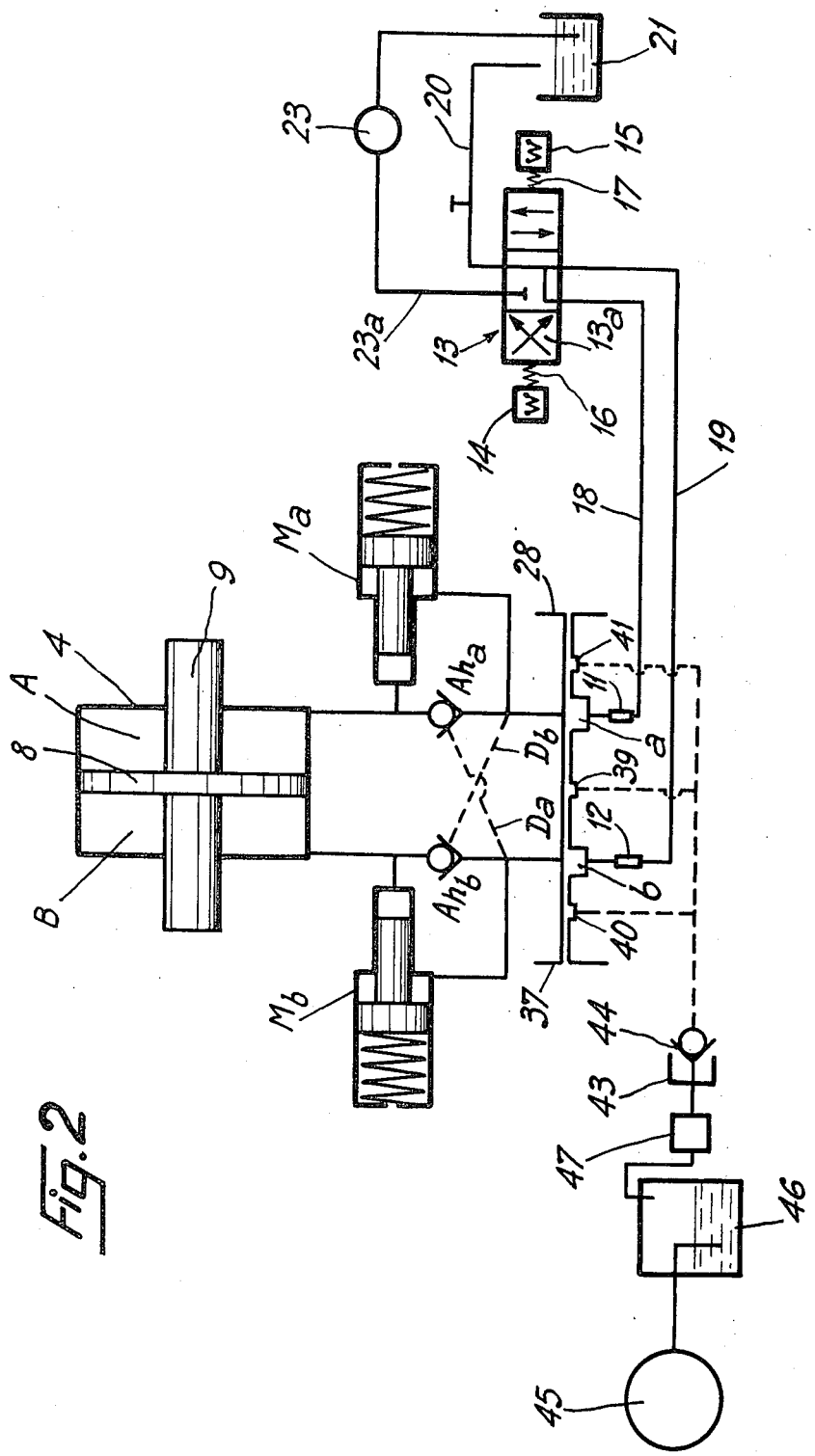

The invention will now be described, by way of example, with reference to the accompanying drawings, in which FIG. 1 is a sectional view of a rotary jack with its radial rotary hydraulic joint improved according to the invention, this Figure showing parts of the jack in two different radial planes which are inclined to one another and intersect along the longitudinal axis of the jack, and FIG. 2 is a schematic hydraulic and pneumatic circuit diagram of the jack of FIG. 1.

The rotary jack shown in FIG. 1 has an enveloping casing 1 which collects the oil lost from the jack and evacuates this oil via an outlet pipe 2. The casing 1 encloses the fixed part 3 and the rotary part 4 of the assembly constituting the rotary jack, its radial hydraulic joint and the different members which enable the hydraulic isolation of the rotary part 4 and the maintenance of pressure in each of the compartments of the jack in turn.

The fixed and rotary parts 3 and 4 are mutually centred by two bearings 5 and 6. The assembly is mounted in a cradle 7 of the casing 1. The jack, formed in the rotary part, comprises a piston 8 secured to an axial sleeve 9 connected to a rotary control member (not shown), for example a control member for actuating a work-holding chuck of a machine tool. The piston 8 defines, in the cylinder of the jack, two compartments A and B, the compartment A being closed by an end cover 10.

In the fixed part 3 are provided grooves $a$ and $b$. FIG. 2 shows how these two grooves are connected via pipe unions 11 and 12 to a distributor 13. This distributor 13 has a movable part or slide valve 13$a$ which, under the influence of two electro-magnets 14 and 15 and two opposed springs 16 and 17, can take up three different positions.

In the position of the slide valve 13$a$ shown in FIG. 2, only the two springs 16 and 17 are active and the slide valve 13$a$ rests in an intermediate position, in which two fixed portions 18 and 19 of the piping which connects the unions 11 and 12, respectively, to the distributor 13 are connected to one another and to a pipe 20 leading to an oil tank 21. The pipe 20 is arranged so that it does not dip into the oil in the tank 21, in order to avoid oil return effects due to syphoning. In this intermediate position of the slide valve 13$a$, an oil supply pipe 23$a$ leading from the tank and placed under pressure by a pump 23 is closed.

When one or other of the electro-magnets 14 and 15 is excited, one of the grooves $a$ and $b$ is connected to the pressurised oil supply pipe 23$a$ and the other exhausts to the tank 21. FIG. 1 shows the situation when the groove $b$ is supplied with oil under pressure.

The rotary part 4 has a longitudinally disposed cylindrical cavity 24 having portions 24$a$, 24$b$ of two different diameters. In this cavity 24 there is a hydraulic pressure accumulator constituted by a differential piston 25 movable by a spring 26. Via borings 27 (not shown in detail), the groove $b$ communicates with the portion 24$a$ of the cavity 24 to the right (as viewed in FIG. 1) of the change in diameter of the differential piston. The portion 24$b$ of smaller diameter of the cavity is in communication with the compartment B.

The groove $b$ also communicates directly with a longitudinally disposed cavity 28 in the rotary part 4. In the cavity 28 there is arranged a non-return valve 29 which is maintained on its seat by a spring 30. Oil under pressure, originating from the groove $b$, can force the valve 29 off its seat and flow, via holes 31 in the valve, into the compartment B.

In addition, when the groove $a$ is supplied with oil under pressure via passageways (not shown), a space 32 in the rotary part 4 is placed under pressure. This causes displacement of a piston 33 to the right (as viewed in FIG. 1) so that an axial extension 34 of the piston opens the valve 29. Thus, the compartment A can receive oil under pressure, from the groove $a$, whilst the compartment B is connected to exhaust via the open valve 29.

As is described in detail in the aforesaid Specification, the same members (pressure accumulator, non-return valve and means for opening the non-return valve) are arranged in the passageway from the groove $a$ to the compartment A, in order to place the latter under pressure, and in the passageway from the groove $b$ for exhausting the compartment A by opening of the corresponding non-return valve. This arrangement is shown schematically in FIG. 2 where the non-return valves $Ah_a$ and $Ah_b$ are disposed in the passageways between the grooves $a$ and $b$ and the compartments A and B, respectively. The dotted lines $D_a$ and $D_b$ show schematically the pistons which force open the valves, whilst the spring-urged differential pressure accumulators $M_a$ and $M_b$ serve as pressure multipliers.

In the fixed part 3 an auxiliary groove 39 is formed between the groove $a$ and $b$ and an auxiliary groove 40,41 is formed between each of the grooves $a$ and $b$ and the respective end 37,38 of the narrow annular gap where the fixed part 3 is close to the rotary part 4. These grooves 39–41 are placed in communication, via borings 42, with a compressed air inlet pipe 43 which contains a non-return valve 44.

As shown schematically in FIG. 2, the inlet pipe 43 is connected to a compressed air source 45 via a control valve 47 and a device 46 for saturating the air with an oil mist.

The manner of operation of the rotary jack described above is as follows:

When it is desired, for example, to force the piston 8 to the right (as viewed in FIG. 1), the slide valve 13$a$ of the distributor 13 is moved towards the right (as viewed in FIG. 2) by excitation of the electro-magnet 15. Thus, the valve $Ah_b$ is forced open and the valve $Ah_a$ is opened by the piston corresponding to the piston 33 for this passageway. The spring of the accumulator $M_b$ is placed under pressure.

When the desired operation of the rotary jack has been accomplished (for example, in the case of a jack on a machine tool, the locking of a workpiece in the chuck) the electro-magnet 15 is deenergized, so that the slide valve 13a returns to the position shown in FIG. 2, and the air control valve 47 is opened.

The two compartments A and B of the jack are now isolated, the compartment B being under the pressure determined by its accumulator, while the air is blown into the three grooves 39, 40 and 41. The oil which remains in the annular gap between the jack parts 3 and 4 is thus forced towards the grooves a and b and towards the ends 37 and 38 of the annular gap. Since the grooves a and b are at atmospheric pressure and in communication with the tank 21, all the oil disappears from the annular gap between the fixed and movable parts 3 and 4.

The expulsion of the oil from the annular gap may be effected by an air blast of relatively high pressure (for example from 3 to 10 bars) which, after operating for several seconds, has its pressure reduced to a much lower value, for example 0.5 bar. Preferably, however, a constant mean value of the pressure is used (for example 2 bars), which simplifies the control arrangements.

The air which passes through the gap between the fixed and rotary parts 3 and 4 has a cooling effect, and the oil transported by the air lubricates the bearings 5 and 6. In addition, permanent over-pressure is established in the casing 1. By escaping from the casing through the various labyrinths and joints of the latter, this high pressure air opposes the entry of foreign matter into the casing via these passageways. In particular, it opposes the entry of the liquid which, when performing machining work on a lathe, such as boring or turning, is sprinkled over the spindle of the machine.

At the time of operation of the jack, i.e. when the air control valve 47 is closed, the non-return valve 44 prevents the return of oil into the air circuit.

The invention is applicable in particular to the control of chucks for gripping workpieces on high speed machine tools.

What is claimed is:

1. A rotary hydraulic double acting jack comprising a cylinder, a piston slidably mounted in said cylinder to define therein two compartments, a rotary hydraulic joint connected to an hydraulic liquid supply for the supply of hydraulic liquid to and the evacuation of hydraulic liquid from at least one of said compartments, which hydraulic joint comprises a fixed, hollow cylindrical part including said cylinder and bearings supporting said rotary part in said fixed part with a narrow annular gap between said rotary and fixed parts, a passageway leading to said one compartment and having a portion in each of said fixed and rotary parts open to said gap, the passageway portion in the rotary part being equipped with at least one liquid flow operated non-return device adapted for admitting a flow of hydraulic liquid only in the direction to said one compartment, flow responsive means operated by hydraulic liquid in the other compartment for opening said non-return device, at least one first groove provided in at least one of said parts and communicating with said passageway portions in said fixed and rotary parts, means for placing said gap and first groove into communication with the atmosphere after the feeding of hydraulic liquid under pressure to said one compartment of the jack cylinder, and means connected to said annular gap for supplying gas under pressure to said annular gap for the purpose of expelling residual hydraulic liquid from said gap after the supply of hydraulic liquid under pressure to said one compartment via said passageway and said non-return device has been completed.

2. A jack according to claim 1, in which said gas-supply means comprises means for supplying the gas under pressure to an at least one second groove formed in said fixed part and opening into said annular gap.

3. A double-acting jack according to claim 1, comprising two first grooves for the supply of hydraulic liquid to the respective compartments of the jack cylinder, a second non-return device in said rotary part leading to the other compartment and a second flow responsive means operated by hydraulic liquid in said one compartment for opening said second non-return device, said gas supply means comprising at least three second grooves formed in said fixed part for the supply of pressurized gas to said annular gap, one of these second grooves being disposed between said two first grooves for supply of hydraulic liquid, and the other two second grooves being disposed respectively between one of said first grooves for the supply of hydraulic liquid and the corresponding end of the annular gap.

4. A jack according to claim 1, comprising means for introducing a mist of oil into said pressurized gas.

5. A jack according to claim 4, in which the jack cylinder is enclosed in an envelope casing which is placed under over-pressure by the arrival of said gas under pressure.

6. A process for operating a two compartment hydraulic double acting jack rotatably mounted in a rotary joint comprising an annular gap communicating with the two jack compartments through respective non-return devices controlled by respective flow responsive means operated by flow in the compartments, said process consisting in the following successive steps:

a. supplying hydraulic liquid to said annular gap and therefrom to one of said two jack compartments through the respective non-return device;
b. interrupting the supply of hydraulic liquid to said annular gap;
c. placing said annular gap into communication with the atmosphere;
d. supplying gas under pressure to said annular gap for expelling residual hydraulic liquid from said gap;
e. interrupting the supply of gas to said annular gap;
f. supplying hydraulic liquid to said annular gap and therefrom to the other jack compartment through the respective non-return device, and
g. repeating steps b) through f), inclusive.

* * * * *